(12) United States Patent
Zou et al.

(10) Patent No.: US 11,831,243 B2
(45) Date of Patent: Nov. 28, 2023

(54) POWER CONVERTER WITH LOSSLESS CURRENT SENSING CAPABILITY AND METHOD FOR IMPLEMENTING THE SAME

(71) Applicant: INNOSCIENCE (SUZHOU) TECHNOLOGY CO., LTD., Suzhou (CN)

(72) Inventors: Yanbo Zou, Suzhou (CN); Yulin Chen, Suzhou (CN); Fada Du, Suzhou (CN); Tao Zhang, Suzhou (CN)

(73) Assignee: INNOSCIENCE (SUZHOU) TECHNOLOGY CO., LTD., Jiangsu (CN)

( * ) Notice: Subject to any disclaimer, the term of this patent is extended or adjusted under 35 U.S.C. 154(b) by 324 days.

(21) Appl. No.: 17/429,358

(22) PCT Filed: Apr. 12, 2021

(86) PCT No.: PCT/CN2021/086521
§ 371 (c)(1),
(2) Date: Aug. 9, 2021

(65) Prior Publication Data
US 2022/0329165 A1    Oct. 13, 2022

(51) Int. Cl.
*H02M 3/335*    (2006.01)
*H02M 1/00*    (2006.01)
*H02M 1/34*    (2007.01)

(52) U.S. Cl.
CPC ..... *H02M 3/33569* (2013.01); *H02M 1/0009* (2021.05); *H02M 3/33592* (2013.01);
(Continued)

(58) Field of Classification Search
CPC .. H02M 1/0009; H02M 1/348; H02M 3/3353; H02M 3/33569; H02M 3/33507; H02M 3/33576; Y02B 70/10
See application file for complete search history.

(56) References Cited

U.S. PATENT DOCUMENTS

| 2011/0205763 A1* | 8/2011 | Artusi | H02M 1/4225 |
| | | | 363/21.06 |
| 2014/0009084 A1 | 1/2014 | Veskovic | |

(Continued)

FOREIGN PATENT DOCUMENTS

| CN | 104521325 A | 4/2015 |
| CN | 104734514 A | 6/2015 |

(Continued)

OTHER PUBLICATIONS

Notice of Allowance of corresponding China patent application No. 202180004498.7 dated Nov. 30, 2022.

(Continued)

*Primary Examiner* — Harry R Behm
*Assistant Examiner* — Johana Dumeng-Roman
(74) *Attorney, Agent, or Firm* — JCIPRNET

(57) ABSTRACT

The subject application provides a power converter with lossless current sensing capability. The power converter comprises: a transformer, a primary switch for conducting or blocking a current flowing in a primary winding of the transformer, a controller configured to generate a first control signal through a first control node to control the primary switch; and a current sensing circuit configured for sensing a current flowing in the primary winding. The current sensing circuit comprises a current sensing switch that is configured to be normally open and has a gate length smaller than a gate length of the primary switch. A relatively simple current sensing circuit is achieved and the overall power efficiency is improved.

20 Claims, 6 Drawing Sheets

(52) U.S. Cl.
CPC .......... *H02M 1/348* (2021.05); *H02M 3/3353* (2013.01); *H02M 3/33507* (2013.01); *Y02B 70/10* (2013.01)

(56) References Cited

U.S. PATENT DOCUMENTS

2014/0204625 A1\* 7/2014 Liu .................. H02M 3/33592
                                                                    363/21.13
2017/0179834 A1 6/2017 Lin
2018/0226895 A1\* 8/2018 Song ................ H02M 3/33592

FOREIGN PATENT DOCUMENTS

| CN | 106887959 A | 6/2017 |
| CN | 111193395 A | 5/2020 |
| CN | 112217399 A | 1/2021 |

OTHER PUBLICATIONS

International Search Report and Written Opinion of the corresponding PCT application No. PCT/CN2021/086521 dated Jan. 14, 2022.

\* cited by examiner

POWER CONVERTER WITH LOSSLESS CURRENT SENSING CAPABILITY AND METHOD FOR IMPLEMENTING THE SAME

TECHNICAL FIELD

The subject application generally relates to a gallium nitride (GaN) based power converter, and more particularly relates to a GaN-based power converter with lossless current sensing capability.

BACKGROUND

GaN-based power devices have been widely used for high frequency electrical energy conversion systems because of low power losses and fast switching transition. In comparison with silicon Metal Oxide Semiconductor Field Effect Transistor (MOSFET), GaN High-Electron-Mobility Transistor (HEMT) has a much better figure of merit and more promising performance for high-power, high-frequency application.

Nowadays, a rapid charger is usually based on a flyback converter in which a transformer having a primary winding and a secondary winding is controlled to transfer power from an alternate current (AC) or direct current (DC) source to a load. In particular, a GaN-based switch may be coupled in series with the primary winding and controlled by a controller. When the switch is turned on, a current is conducted through the primary winding and energy is stored in a magnetic core of the transformer. When the switch is turned off, a current is induced in the secondary winding, and thus the energy stored in the magnetic core is released through the secondary winding to the load.

SUMMARY

One object of the subject application is to provide a power converter with lossless current sensing capability and suitable for high frequency applications.

According to one aspect of the subject application, it is provided a power converter with lossless current sensing capability. The power converter comprises: a transformer having a primary winding and a secondary winding; the primary winding having a first primary winding terminal and a second primary winding terminal, the secondary winding having a first secondary winding terminal and a second secondary winding terminal; a primary switch Q1 for conducting or blocking a current flowing in the primary winding of the transformer; a secondary switch Q2 for conducting or blocking a current flowing in the secondary winding of the transformer; a controller having a first control node and a second first control node, and configured to generate a first control signal through the first control node to control the primary switch Q1 and a second control signal through the second control node to control the secondary switch Q2 such that the primary switch Q1 and the secondary switch Q2 are switched ON and OFF alternately, and a current sensing circuit configured for sensing the current flowing in the primary winding of the transformer. The current sensing circuit comprises a current sensing switch Qs having a control terminal being connected to a first control node of the controller, a first conduction terminal being connected to the second primary winding terminal and a second conduction terminal being connected to a first current sensing node of the controller; and a first current sensing resistor having a first terminal being connected to the first current sensing node of the controller and a second terminal being connected to a primary ground. The current sensing switch Qs is configured to be normally open. The controller is further configured to receive, through the first current sensing node, a first current sensing signal $V_{CS1}$ indicative of a conducting current flowing through the primary winding; calculate a first voltage difference between the first current sensing signal $V_{CS1}$ and a first reference voltage $V_{ref1}$; and adjust a switching-on time and a switching-off time of the primary switch Q1 based on the calculated first voltage difference. The current sensing switch Qs has a gate length $l_{g\_Qs}$ smaller than a gate length $l_{g\_Q1}$ of the primary switch Q1.

Since the current sensing switch Qs has a gate length smaller than the gate length of the primary switch Q1, only a negligible amount of current is used for current sensing. No current loss will be caused and therefore the overall power efficiency will be greatly improved. Furthermore, as the current sensing switch Qs is configured to be normally open, a relatively simple current sensing circuit can be achieved as there is no need to have a complicated circuit to control the conduction of the current during power conversion.

BRIEF DESCRIPTION OF THE DRAWINGS

Aspects of the present disclosure are readily understood from the following detailed description when read with the accompanying figures. It should be noted that various features may not be drawn to scale. That is, the dimensions of the various features may be arbitrarily increased or reduced for clarity of discussion. Embodiments of the present disclosure are described in more detail hereinafter with reference to the drawings, in which.

DETAILED DESCRIPTION

In the following description, embodiments of a power converter with lossless current sensing capability are set forth as preferred examples in accordance with the subject application. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Reference in this specification to "one embodiment" or "an embodiments" means that a particular feature, structure, or characteristic described in connection with the embodiment is included in at least one of the embodiments of the invention. The appearances of the phrase "in one embodiment" or "in some embodiments" in various places in the specifications are not necessarily all referring to the same embodiments, nor are separate or alternative embodiments mutually exclusive of other embodiments. Moreover, various features are described which may be exhibited by some embodiments and not by others.

Figure 1:
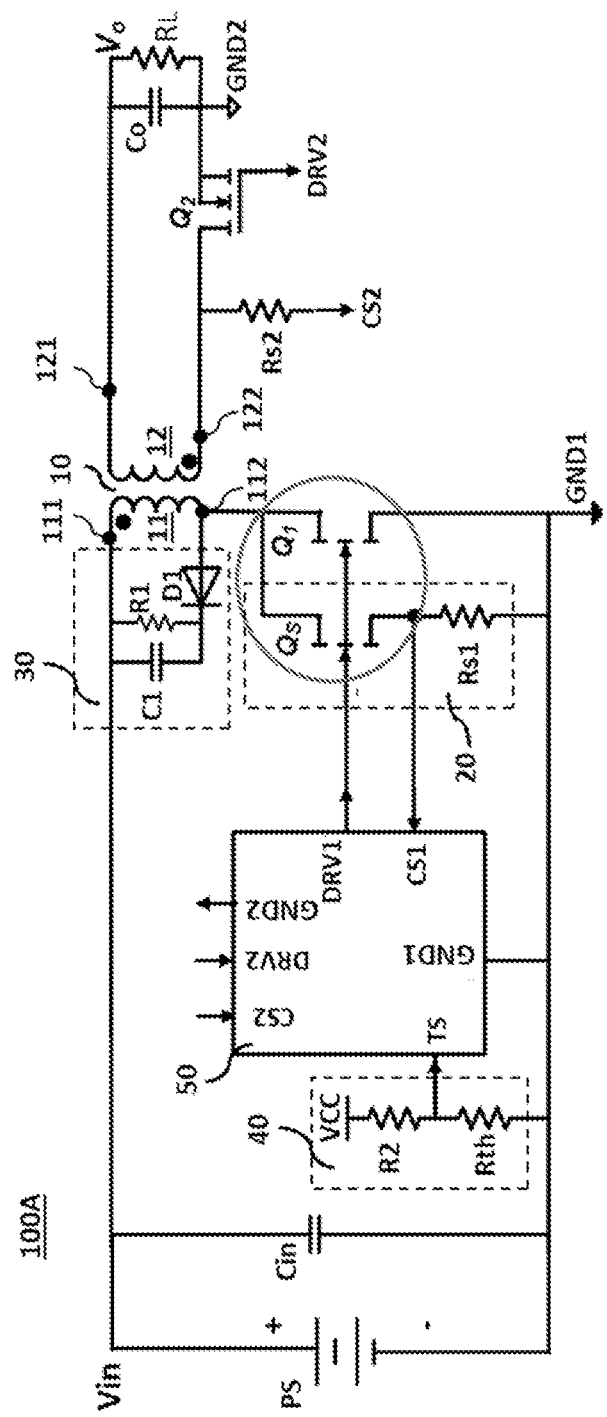
FIG. 1 depicts a simplified circuit diagram of a power converter with lossless current sensing capability according to an embodiment of the subject application.

FIG. 1 is a circuit diagram of a power converter 100A with lossless current sensing capability according to an embodiment of the present invention.

Referring to FIG. 1, the power converter 100A may comprise a transformer 10 for transferring power from a power supply PS to a load $R_L$. The transformer 10 has a primary winding 11 and a secondary winding 12. The primary winding 11 has a first primary winding terminal 111 and a second primary winding terminal 112. The secondary winding 12 has a first secondary winding terminal 121 and a second secondary winding terminal 122.

The power converter 100A may further comprise a primary switch Q1 for conducting or blocking a current flowing in the primary winding 11 of the transformer 10, a secondary switch Q2 for conducting or blocking a current flowing in the secondary winding 12 of the transformer 10, and a controller 50 for controlling the operation of the primary switch Q1 and the secondary switch Q2.

The controller 50 may be configured to generate a first control signal through a first control node DRV1 to control the primary switch Q1 and generate a second control signal through a second control node DRV2 to control the secondary switch Q2 such that the primary switch Q1 and the secondary switch Q2 are switched ON and OFF alternately.

The primary switch Q1 may have a control terminal, a first conduction terminal and a second conduction terminal. The first conduction terminal of the primary switch Q1 is connected to the second primary winding terminal 112. The second conduction terminal of the primary switch Q1 is connected to a primary ground GND1. The control terminal of the primary switch Q1 is connected to the first control node DRV1 of the controller 50.

The secondary switch Q2 may have a control terminal, a first conduction terminal and a second conduction terminal. The control terminal of the secondary switch Q2 is connected to a second control node DRV2 of the controller 50. The first conduction terminal of the secondary switch Q2 is connected to the second secondary winding terminal 122. The second conduction terminal of the secondary switch Q2 is connected to a secondary ground GND2.

In some embodiments, each of the primary switches Q1 and Q2 may be a gallium nitride (GaN) high-electron-mobility-transistor (HEMT) with the control terminal being a gate terminal, the first conduction terminal being a drain terminal and the second conduction terminal being a source terminal.

The power converter may further comprise a current sensing circuit 20 for sensing the current flowing in the primary winding of the transformer. The current sensing circuit 20 may have a sensing input terminal connected to the second primary winding terminal 112; a control terminal connected to the first control node DRV1 of the controller 50; a sensing output terminal connected to a first current sensing node CS1 of the controller 50 and a reference terminal connected to the primary ground GND1.

The current sensing circuit 20 may comprise a current sensing switch Qs and a first current sensing resistor Rs1. The current sensing switch Qs has a control terminal, a first conduction terminal and a second conduction terminal. The control terminal of the current sensing switch Qs is connected to the first control node DRV1 of the controller 50. The first conduction terminal of the current sensing switch Qs is connected to the second primary winding terminal 112.

The second conduction terminal of the current sensing switch Qs is connected to the first current sensing node CS1 of the controller 50.

The first current sensing resistor $R_{s1}$ has a first terminal and a second terminal. The first terminal of the first current sensing resistor $R_{s1}$ is connected to the first current sensing node CS1 of the controller 50. The second terminal of the first current sensing resistor $R_{s1}$ is connected to the primary ground GND1.

The controller may be further configured to: receive, through the first current sensing node CS1, a first current sensing signal $V_{CS1}$; calculate a first voltage difference between the first current sensing signal $V_{CS1}$ and a first reference voltage $V_{ref1}$; and adjust a switching-on time and a switching-off time of the primary switch based on the calculated first voltage difference.

The current sensing switch Qs may be configured to be normally open. For example, the current sensing switch Qs may be an enhancement-mode gallium nitride (GaN) high-electron-mobility-transistor (HEMT) with the control terminal being a gate terminal, the first conduction terminal being a drain terminal and the second conduction terminal being a source terminal.

Preferably, the current sensing switch Qs may have a gate length $l_{g\_Qs}$ smaller than a gate length $l_{g\_Q1}$ of the primary switch Q1. As a result, the current sensing switch Qs may have an on-resistance $R_{Qs\_ON}$ higher than an on-resistance $R_{Q1\_ON}$ of the primary switch Q1.

Preferably, the ratio of the gate length $l_{g\_Qs}$ of the current sensing switch to the gate length $l_{g\_Q1}$ of the primary switch Q1 is in a range of approximately 1/10 to approximately 1/1000.

Preferably, the ratio of the on-resistance $R_{Qs\_ON}$ of the current sensing switch Qs to the on-resistance $R_{Q1\_ON}$ of the primary switch Q1 is in a range of approximately 10 to approximately 1000.

Preferably, the first current sensing resistor $R_{s1}$ may have a resistance value given by $R_{s1} \geq 10 R_{Q1\_ON}$, where $R_{Q1\_ON}$ is the on-resistance of the primary switch Q1.

For example, when the primary switch Q1 has an on-resistance of 200 milliohms (mΩ), the current sensing switch Qs may have an on-resistance of 20 ohms (Ω) while the first current sensing resistor $R_{s1}$ may have a resistance value of 2Ω.

The power converter 100A may further comprise a second current sensing resistor $R_{s2}$. The second current sensing resistor $R_{s2}$ has a first terminal and a second terminal. The first terminal of the second current sensing resistor $R_{s2}$ is connected to the second secondary winding terminal 122. The second terminal of the second current sensing resistor $R_{s2}$ is connected to a second current sensing node CS2 of the controller 50.

The controller may be further configured to: receive, through the second current sensing node CS2, a second current sensing signal $V_{CS2}$; calculate a second voltage difference between the second current sensing signal $V_{CS2}$ and a second reference voltage $V_{ref2}$; and adjust a switching-on time and a switching-off time of the secondary switch based on the calculated second voltage difference.

The second current sensing resistor $R_{s2}$ may have a resistance value given by $R_{s2} \geq 10 R_{Q2\_ON}$, where $R_{Q2\_ON}$ is the on-resistance of the secondary switch Q2.

For example, when the secondary switch Q2 has an on-resistance of 200 milliohms (mΩ), the second current sensing resistor $R_{s2}$ may have a resistance value of 2Ω.

The power converter 100A may further comprise a clamping circuit 30 for clamping an input voltage to a desired DC level. The clamping circuit 30 may be coupled to the primary winding 11 of the transformer 10. The clamping circuit 30 may comprise a diode D1, a capacitor C1 and a resistor R1. The diode D1 has a positive terminal connected to the second primary winding terminal 112 and a negative terminal connected to the resistor R1. The capacitor C1 has a first terminal connected to the first primary winding terminal 111 and a second terminal connected to the negative terminal of the diode D1. The resistor R1 has a first terminal connected to the first primary winding terminal 111 and a second terminal connected to the negative terminal of the diode D1. That is, the resistor R1 is connected in parallel with the capacitor C1.

The power converter 100A may further comprise an input filtering circuit including an input filtering capacitor Cin coupled to the power supply PS. The input capacitor Cin has a first terminal connected to the first primary winding terminal 111 and a second terminal connected to the primary ground GND1.

The power converter 100A may further comprise an output filtering circuit including an output filtering capacitor Co coupled to the load $R_L$. The output capacitor Co has a first terminal connected to the first secondary winding terminal 121 and a second terminal connected to the secondary ground GND2.

The power converter 100A may further comprise a temperature sensing circuit 40 for sensing an operating temperature of the power converter and generating a temperature sensing signal $V_{th}$ to a temperature sensing node TS of the controller 50.

The temperature sensing circuit 40 may comprise a resistor R2 and a thermistor Rth which is preferably a negative temperature coefficient (NTC) thermistor. The resistor R2 may have a first terminal connected to a VCC voltage supply and a second terminal connected to the temperature sensing node TS of the controller 50. The thermistor $R_{th}$ may have a first terminal connected to the temperature sensing node TS of the controller 50 and a second terminal connected to the primary ground GND1.

The controller 50 may be further configured to: receive the temperature sensing signal $V_{th}$ through the temperature sensing node TS; calculate a first compensation voltage $V_{comp1}$ to adjust the first reference voltage $V_{ref1}$ based on the received temperature sensing signal $V_{th}$; and calculate a second compensation voltage $V_{comp2}$ to adjust the second reference voltage $V_{ref2}$ based on the received temperature sensing signal $V_{th}$.

For example, the first reference voltage $V_{ref1}$ may be calibrated to have a preset value $V_{ref1\_pre}$ at a reference temperature Tr (such as a room temperature 25° C.). If the operating temperature Top is higher than the reference temperature Tr, the first compensation voltage $V_{comp1}$ will be given by $V_{comp1}=m1*(Top-Tr)$, where m1 is a compensation index related to a first thermal coefficient of the thermistor $R_{th}$ at temperatures higher than the reference temperature Tr. If the operating temperature Top is lower than the reference temperature Tr, the first compensation voltage $V_{comp1}$ will be given by $V_{comp1}=m2*(Top-Tr)$, where m2 is a compensation index related to a second thermal coefficient of the thermistor $R_{th}$ at temperatures lower than the reference temperature Tr. Then the first reference voltage $V_{ref1}$ may be adjusted and given by $V_{ref1}=V_{ref1\_pre}+V_{comp1}$. Normally, m1 is greater than 1 and m2 is greater than 0 and less the 1.

Similarly, the second reference voltage $V_{ref2}$ may be calibrated to have a preset value $V_{ref2\_pre}$ at a reference temperature Tr (such as a room temperature 25° C.). If the operating temperature Top is higher than the reference temperature Tr, the second compensation voltage $V_{comp2}$ will be given by $V_{comp2}=m1*(Top-Tr)$, where m1 is a compensation index related to a second thermal coefficient of the thermistor $R_{th}$ at temperature higher than the reference temperature Tr. If the operating temperature Top is lower than the reference temperature Tr, the second compensation voltage $V_{comp2}$ will be given by $V_{comp2}=m2*(Top-Tr)$, where m2 is a compensation index related to a second thermal coefficient of the thermistor $R_{th}$ at temperature lower than the reference temperature Tr. Then the second reference voltage $V_{ref2}$ may be adjusted and given by $V_{ref2}=V_{ref2\_pre}+V_{comp2}$. Normally, m1 is greater than 1 and m2 is greater than 0 and less the 1.

Figure 2:
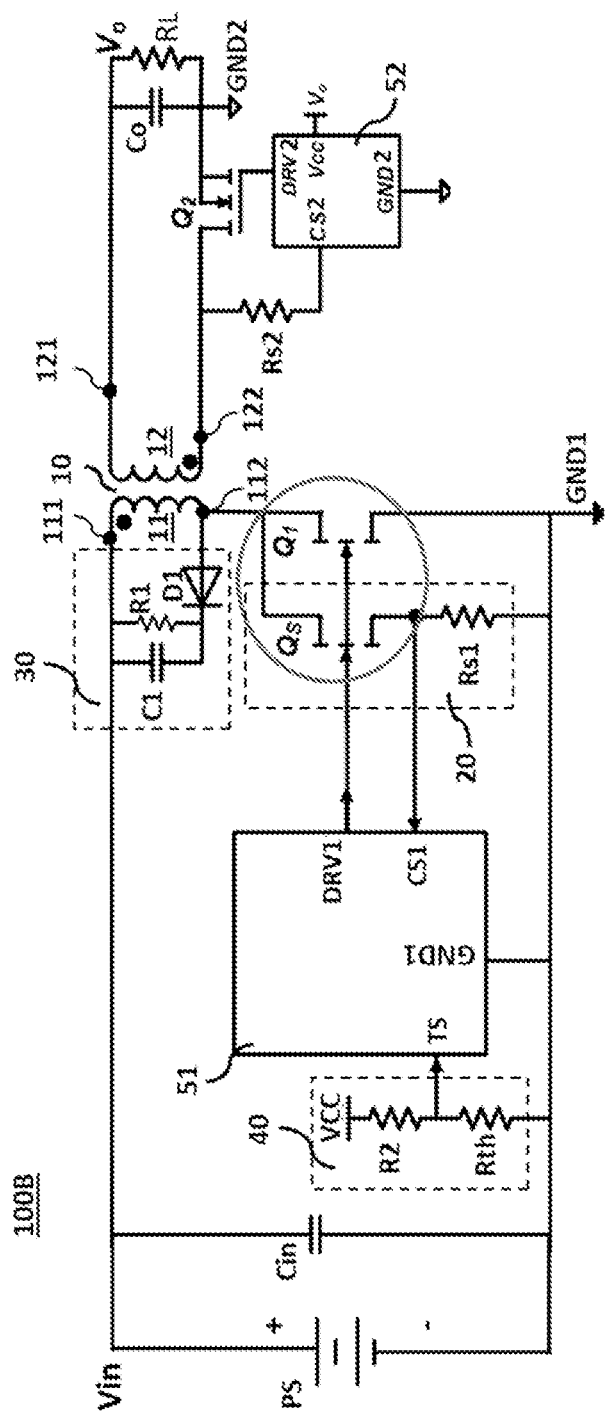
FIG. 2 depicts a simplified circuit diagram of a power converter with lossless current sensing capability according to another embodiment of the subject application.

FIG. 2 is a circuit diagram of a power converter 100B with lossless current sensing capability according to another embodiment of the present invention. The power converter 100B of FIG. 2 is similar to the power converter 100A of FIG. 1 except for that the power converter 100B comprises a primary controller 51 and a secondary controller 52 for controlling operation of the primary switch Q1 and secondary switch Q2, respectively. For simplicity, identical elements in FIGS. 1 and 2 are given the same reference numerals and will not be further described in details.

Referring to FIG. 2. The control terminal of the primary switch Q1 is connected to a control node DRV1 of the primary controller 51. The control terminal of the current sensing switch Qs is connected to the control node DRV1 of the primary controller 51. The second conduction terminal of the current sensing switch Qs is connected to a current sensing node CS1 of the primary controller 51.

The control terminal of the secondary switch Q2 is connected to a control node DRV2 of the secondary controller 52. The second terminal of the second current sensing resistor $R_{s2}$ is connected to a current sensing node CS2 of the secondary controller 52.

In some embodiments, the power converter 100B may furth comprise a coupler connected between the primary controller 51 and the secondary controller 52 for communication between the primary controller 51 and the secondary controller 52. The coupler may be an opto-coupler or a magnetic coupler.

Figure 3:
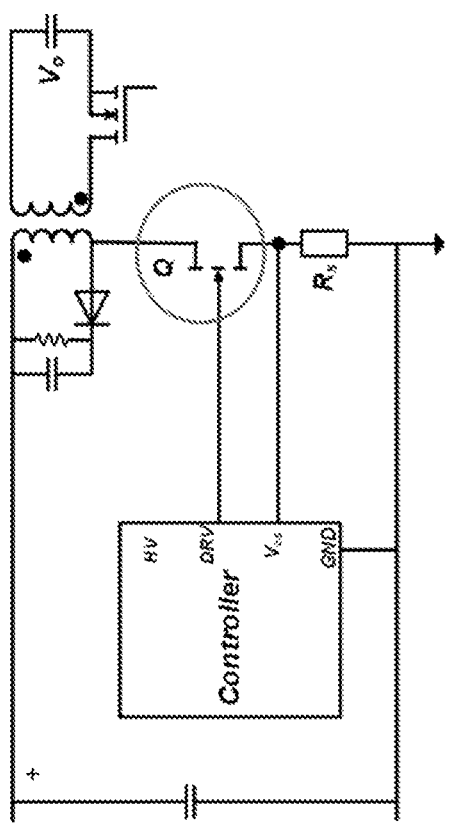
FIG. 3 depicts a simplified circuit diagram of a power converter according to another embodiment of the subject application.

Attempts have been made to implement a current sensing scheme in flyback converter to minimize switching loss. For example, as shown in FIG. 3, a sampling resistor Rs is connected in series with a primary switch Q coupled with a primary winding so as to obtain a feedback signal. However, as the current flowing though the primary winding also flow through the sample resistor Rs, a significant dissipation loss will be caused, thus the overall power efficiency will be greatly reduced.

Another approach is to use a depletion mode transistor as a current sensing switch connected in parallel with the primary switch for conducting a sampling current which is a small portion of the current flowing through the primary winding, a sampling resistor is then connected in series with the depletion mode transistor for generating a feedback signal. However, as the depletion mode transistor works as a normally-closed switch, it is not suitable for using in power conversion. To solve this technical issue, the depletion mode transistor may be connected in series with an additional MOSFET that is used to control the conduction of the current flowing through the depletion mode transistor. However, such approach requires a relatively complicated circuit with increased number of components that can result in relatively great parasitic reactance which may have impact to high frequency performance. Moreover, the additional MOSFET will increase the on-resistance of the overall circuit, thus cause a higher conduction loss.

FIGS. 4A-4E depict flowcharts of a method for implementing a power converter with lossless current sensing capability according to an embodiment of the subject application.

Figure 4A:
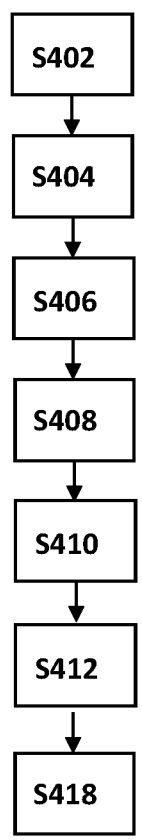
FIGS. 4A-4E depict flowcharts of a method for implementing a power converter with lossless current sensing capability according to an embodiment of the subject application.

Referring to FIG. 4A. The method may comprise the following steps:

S402: providing a transformer having a primary winding and a secondary winding; the primary winding having a first primary winding terminal and a second primary winding terminal, the secondary winding having a first secondary winding terminal and a second secondary winding terminal;

S404: providing a primary switch Q1, connecting a first conduction terminal of the primary switch to the first primary winding terminal, and connecting a second conduction terminal of the primary switch to a primary ground;

S406: providing a secondary switch Q2, connecting a first conduction terminal of the secondary switch to the second secondary winding terminal, and connecting a second conduction terminal of the secondary switch to a secondary ground;

S408: providing a controller having a first control node and a second control node; connecting the first control node to a control terminal of the primary switch Q1, the second control node to a control terminal of the secondary switch Q2;

S410: providing a current sensing switch Qs configured to be normally open, connecting a control terminal of the current sensing switch to a first control node of the controller, connecting a first conduction terminal of the current sensing switch to the second primary winding terminal, and connecting a second conduction terminal of the current sensing switch to a first current sensing node of the controller;

S412: providing a first current sensing resistor $R_{s1}$, connecting a first terminal of the first current sensing resistor $R_{s1}$ to the first current sensing node of the controller, and connecting a second terminal of the current sensing resistor to the primary ground.

Preferably, the current sensing switch Qs may be an enhancement-mode gallium nitride (GaN) high-electron-mobility-transistor (HEMT).

In some embodiments, the primary switch Q1 is a gallium nitride (GaN) high-electron-mobility-transistor (HEMT) having a gate length $l_{g\_Q1}$; and the current sensing switch Qs may have a gate length $l_{g\_Qs}$ smaller than the gate length of the primary switch $l_{g\_Q1}$. Preferably, the ratio of the gate length $l_{g\_Qs}$ of the current sensing switch Qs to the gate length $l_{g\_Q1}$ of the primary switch Q1 is in a range of approximately 1/10 to approximately 1/1000.

Preferably, the first current sensing resistor $R_{s1}$ may have a resistance value given by $R_{S1} \geq 10R_{Q1\_ON}$, where $R_{Q1\_ON}$ is the on-resistance of the primary switch Q1.

Referring back to FIG. 4A, the method for implementing a power converter may further comprise step S418: providing a second current sensing resistor $R_{s2}$, connecting a first terminal of the second current sensing resistor $R_{s2}$ to the second terminal secondary winding, connecting a second terminal of the second current sensing resistor $R_{s2}$ to a second current sensing node of the controller.

Figure 4B:
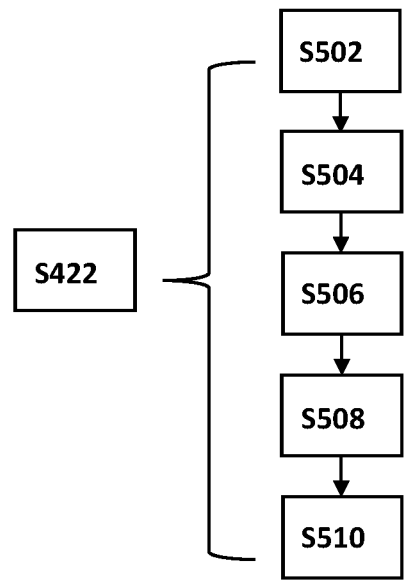

Referring to FIG. 4B, the method for implementing a power converter may further comprise step S422: implementing a clamping circuit. The implementation of the clamping circuit may comprise:

S502: providing a diode D1, a capacitor C1 and a resistor R1;

S504: connecting a positive terminal of the diode D1 to the second primary winding terminal;

S506: connecting a first terminal of the capacitor C1 to the first primary winding terminal;

S508: connecting a second terminal of the capacitor C1 to a negative terminal of the diode D1; and S510: connecting a first resistor R1 connected in parallel to the capacitor C1.

Figure 4C:
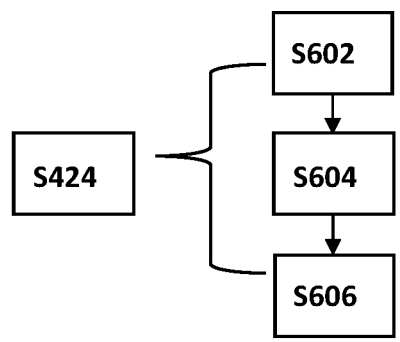

Referring to FIG. 4C, the method for implementing a power converter may further comprise step S424: implementing an input filtering circuit. The implementation of the input filtering circuit may comprise:

S602: providing an input filtering capacitor;

S604: connecting a first terminal of the input filtering capacitor to the first primary winding terminal; and S606: connecting a second terminal of the input filtering capacitor to the primary ground.

Figure 4D:
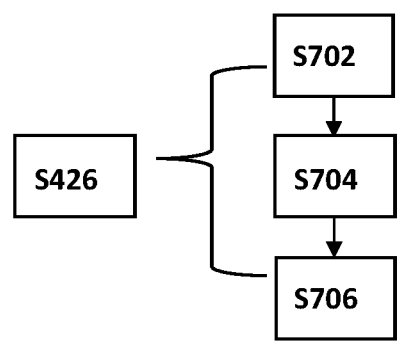

Referring to FIG. 4D, the method for implementing a power converter may further comprise step S426: implementing an output filtering circuit. The implementation of the output filtering circuit may comprise:

S702: providing an output filtering capacitor;

S704: connecting a first terminal of the output filtering capacitor to the first secondary winding terminal; and S706: connecting a second terminal of the output filtering capacitor to the secondary ground.

Figure 4E:
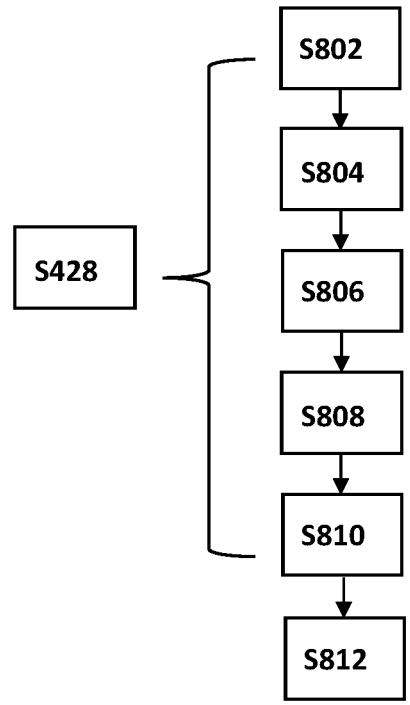

Referring to FIG. 4E, the method for implementing a power converter may further comprise step S428: implementing a temperature sensing circuit. The implementation of the temperature sensing circuit may comprise:

S802: providing a thermistor $R_{th}$ and a resistor R2;

S804: connecting a first terminal of the thermistor R4 to a temperature sensing node of the controller and connecting a second terminal of the thermistor $R_{th}$ to the primary ground;

S806: connecting a first terminal of the resistor R2 to a VCC voltage supply and connecting a second terminal of the resistor R2 to the temperature sensing node of the controller;

S808: configuring the controller to receive a temperature sensing signal from the temperature sensing circuit;

S810: configuring the controller to adjust a first reference voltage based on the received temperature sensing signal; and S812: configuring the controller to adjust a second reference voltage based on the received temperature sensing signal.

The foregoing description of the present invention has been provided for the purposes of illustration and description. It is not intended to be exhaustive or to limit the invention to the precise forms disclosed. Many variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation.

As used herein, the singular terms "a," "an," and "the" may include plural referents unless the context clearly dictates otherwise.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances.

While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A power converter with lossless current sensing capability, comprising:
    a transformer having a primary winding and a secondary winding; the primary winding having a first primary winding terminal and a second primary winding terminal, the secondary winding having a first secondary winding terminal and a second secondary winding terminal;
    a primary switch Q1 for conducting or blocking a current flowing in the primary winding of the transformer;
    a secondary switch Q2 for conducting or blocking a current flowing in the secondary winding of the transformer;
    a controller having a first control node and a second first control node, and configured to generate a first control signal through the first control node to control the primary switch Q1 and a second control signal through the second control node to control the secondary switch Q2 such that the primary switch Q1 and the secondary switch Q2 are switched ON and OFF alternately, and
    a current sensing circuit configured for sensing the current flowing in the primary winding of the transformer; and
    wherein the current sensing circuit comprises:
        a current sensing switch Qs having a control terminal being connected to a first control node of the controller, a first conduction terminal being connected to the second primary winding terminal and a second conduction terminal being connected to a first current sensing node of the controller; and
        a first current sensing resistor having a first terminal being connected to the first current sensing node of the controller and a second terminal being connected to a primary ground;
    wherein the current sensing switch Qs is configured to be normally open; and
    wherein the controller is further configured to:
        receive, through the first current sensing node, a first current sensing signal $V_{CS1}$ indicative of a conducting current flowing through the primary winding;
        calculate a first voltage difference between the first current sensing signal $V_{CS1}$ and a first reference voltage $V_{ref1}$; and
        adjust a switching-on time and a switching-off time of the primary switch Q1 based on the calculated first voltage difference.

2. The power converter according to claim 1, wherein the current sensing switch Qs is an enhancement-mode gallium nitride (GaN) high-electron-mobility-transistor (HEMT).

3. The power converter according to claim 1, wherein the primary switch Q1 is a gallium nitride (GaN) high-electron-mobility-transistor (HEMT).

4. The power converter according to claim 1, wherein the current sensing switch Qs has a gate length $l_{g\_Qs}$ smaller than a gate length $l_{g\_Q1}$ of the primary switch Q1.

5. The power converter according to claim 4, wherein the ratio of the gate length $l_{q\_Qs}$ of the current sensing switch Qs to the gate length $l_{g\_Q1}$ of the primary switch Q1 is in a range of approximately 1/10 to approximately 1/1000.

6. The power converter according to claim 1, wherein the first current sensing resistor has a resistance value given by $R_{S1} \geq 10R_{Q1\_ON}$, where $R_{Q1\_ON}$ is the on-resistance of the primary switch Q1.

7. The power converter according to claim 1, further comprising a secondary current sensing resistor having a first terminal being connected to the second secondary winding terminal; and a second terminal being connected to a second current sensing node of the controller; and
    wherein the controller is configured to:
        receive, through the second current sensing node, a second current sensing signal $V_{CS2}$;
        calculate a second voltage difference between the second current sensing signal $V_{CS2}$ and a second reference voltage $V_{ref2}$; and
        adjust a switching-on time and a switching-off time of the secondary switch Q2 based on the calculated second voltage difference.

8. The power converter according to claim 7 wherein the second current sensing resistor has a resistance value $R_{S2}$ given by $R_{S2} \geq 10R_{Q2\_ON}$ where $R_{Q2\_ON}$ is the on-resistance of the secondary switch Q2.

9. The power converter according to claim 1, further comprising a clamping circuit coupled to the primary winding of the transformer; the clamping circuit comprising:
    a diode D1 having a positive terminal connected to the second primary winding terminal;
    a capacitor C1 having a first terminal connected to the first primary winding terminal and a second terminal connected to a negative terminal of the diode D1; and
    a resistor R1 connected in parallel with the capacitor C1.

10. The power converter according to claim 1, further comprising an input filtering capacitor Cin having a first terminal connected to the first primary winding terminal and a second terminal connected to the primary ground.

11. The power converter according to claim 1, further comprising an output filtering capacitor Co having a first terminal connected to the first secondary winding terminal and a second terminal connected to a secondary ground.

12. The power converter according to claim 1, further comprising a temperature sensing circuit configured for sensing an operating temperature of the power converter and generating a temperature sensing signal $V_{th}$ to a temperature sensing node of the controller; and
    the controller is further configured to:
        receive the temperature sensing signal $V_{th}$ through the temperature sensing node; and
        calculate a first compensation voltage to adjust the first reference voltage $V_{ref1}$ based on the received temperature sensing signal.

13. The power converter according to claim 12, the controller is further configured to calculate a second compensation voltage to adjust the second reference voltage $V_{ref2}$ based on the received temperature sensing signal.

14. The power converter according to claim 1, wherein the temperature sensing circuit comprises a thermistor $R_{th}$ and a resistor R2;
the thermistor $R_{th}$ has a first terminal connected to the temperature sensing node of the controller and a second terminal connected to the primary ground;
the resistor R2 has a first terminal connected to a VCC voltage supply and a second terminal connected to the temperature sensing node of the controller.

15. The power converter according to claim 1, wherein the controller comprises a primary controller and a secondary controller configured for controlling operation of the primary switch Q1 and secondary switch Q2, respectively; and wherein:
the primary controller has a control node being the first control node, and a current sensing node being the first current sensing node; and
the secondary controller has a control node being the second control node, and a current sensing node being the second current sensing node.

16. A method for implementing a power converter with lossless current sensing capability, the method comprising:
providing a transformer having a primary winding and a secondary winding; the primary winding having a first primary winding terminal and a second primary winding terminal, the secondary winding having a first secondary winding terminal and a second secondary winding terminal;
providing a primary switch Q1, connecting a first conduction terminal of the primary switch Q1 to the first primary winding terminal, and connecting a second conduction terminal of the primary switch Q1 to a primary ground;
providing a secondary switch Q2, connecting a first conduction terminal of the secondary switch to the second secondary winding terminal, and connecting a second conduction terminal of the secondary switch Q2 to a secondary ground;
providing a controller having a first control node and a second control node; connecting the first control node to a control terminal of the primary switch Q1, and connecting the second control node to a control terminal of the secondary switch Q2;
providing a current sensing switch Qs configured to be normally open, connecting a control terminal of the current sensing switch Qs to the first control node of the controller, connecting a first conduction terminal of the current sensing switch Qs to the second primary winding terminal, and connecting a second conduction terminal of the current sensing switch Qs to a first current sensing node of the controller;
providing a first current sensing resistor, connecting a first terminal of the current sensing resistor to the first current sensing node of the controller, and connecting a second terminal of the current sensing resistor to the primary ground.

17. The method according to claim 16, further comprising:
providing a second current sensing resistor;
connecting a first terminal of the second current sensing resistor to the second secondary winding terminal; and
connecting a second terminal of the second current sensing resistor to a second current sensing node of the controller.

18. The method according to claim 16, further comprising implementing a clamping circuit by:
providing a diode D1, a capacitor C1 and a resistor R1;
connecting a positive terminal of the diode D1 to the second primary winding terminal;
connecting a first terminal of the capacitor C1 to the first primary winding terminal;
connecting a second terminal of the capacitor C1 to a negative terminal of the diode D1; and
connecting a resistor R1 in parallel with the capacitor C1.

19. The method according to claim 16, further comprising: implementing an input filtering circuit by:
providing an input filtering capacitor;
connecting a first terminal of the input filtering capacitor to the first primary winding terminal; and
connecting a second terminal of the input filtering capacitor to the primary ground; and
implementing an output filtering circuit by:
providing an output filtering capacitor;
connecting a first terminal of the output filtering capacitor to the first secondary winding terminal; and
connecting a second terminal of the output filtering capacitor to the secondary ground.

20. The method according to claim 16, further comprising implementing a temperature sensing circuit by:
providing a thermistor and a resistor R2;
connecting a first terminal of the thermistor to a temperature sensing node of the controller and connecting a second terminal of the thermistor to the primary ground;
connecting a first terminal of the resistor R2 to a VCC voltage supply and connecting a second terminal of the resistor R2 to the temperature sensing node of the controller.

* * * * *